(12) United States Patent
Gilbert et al.

(10) Patent No.: US 8,918,847 B2
(45) Date of Patent: Dec. 23, 2014

(54) LAYER 7 AUTHENTICATION USING LAYER 2 OR LAYER 3 AUTHENTICATION

(71) Applicant: Avaya Inc., Basking Ridge, NJ (US)

(72) Inventors: Ezra Gilbert, c/o Misgrav (IL); Stephen Andrew Baker, Arvada, CO (US); Shai Itzhaki, Kidron (IL); Tilak Ravi, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/630,595

(22) Filed: Sep. 28, 2012

(65) Prior Publication Data

US 2014/0096207 A1   Apr. 3, 2014

(51) Int. Cl.
*G06F 7/04*   (2006.01)

(52) U.S. Cl.
USPC .................................. 726/5; 726/4; 713/182

(58) Field of Classification Search
USPC .......................................... 726/5, 4; 713/182
See application file for complete search history.

(56) References Cited

U.S. PATENT DOCUMENTS

| 8,515,072 B2 * | 8/2013 | Spahic ........................ 380/270 |
| 2005/0135622 A1 * | 6/2005 | Fors et al. .................... 380/268 |
| 2006/0098578 A1 * | 5/2006 | Mallya et al. ................ 370/242 |
| 2009/0034984 A1 * | 2/2009 | Mallya et al. ................ 398/154 |
| 2010/0082977 A1 | 4/2010 | Boyle et al. |
| 2011/0296518 A1 * | 12/2011 | Faynberg et al. .............. 726/13 |
| 2013/0080520 A1 * | 3/2013 | Kiukkonen et al. .......... 709/204 |
| 2013/0173702 A1 * | 7/2013 | Lang et al. ................... 709/204 |

OTHER PUBLICATIONS

Wei, "Federated Cross-Layer Access draft-wei-abfab-fcla-02," ABFAB Internet-Draft, ZTE Corporation, Mar. 12, 2012, retrieved from http://tools.iett.org/html/draft-wei-abfab-fcla-02, 13 pages.

* cited by examiner

*Primary Examiner* — Christopher Brown
(74) *Attorney, Agent, or Firm* — Sheridan Ross P.C.

(57) ABSTRACT

A system and method for authenticating a layer 7 client application (application layer) based on a layer 2 (data link layer) or a layer 3 (network layer) authentication is provided. A request to authenticate to a network is received from a communication device. The request to authenticate to the network is for a layer 2 or layer 3 authentication. The communication device is authenticated to the network based on having the necessary credentials.

A request is received to authenticate a layer 7 client application running on the communication device. The layer 7 client application running on the communication device requires a layer 7 authentication. The layer 7 client application running on the communication device is authenticated based on the layer 2 or layer 3 authentication.

20 Claims, 3 Drawing Sheets

US 8,918,847 B2

LAYER 7 AUTHENTICATION USING LAYER 2 OR LAYER 3 AUTHENTICATION

TECHNICAL FIELD

The systems and methods that relate to authentication and in particular to authentication of Layer 7 applications.

BACKGROUND

Security for Layer 7 protocols, such as, Session Initiation Protocol (SIP), email, File Transfer Protocol (FTP), Telnet, and Domain Naming Service (DNS) typically requires extra gateways, firewalls, or authentication mechanisms in order for the end user to authenticate to the Layer 7 application. The Layer 7 security mechanisms also add additional overhead on client, server, and network resources. For example, in addition to encrypting packets at the network layer, the same packets may also be encrypted at the application layer. In addition, the user may have to authenticate to the network and then authenticate again to the Layer 7 application.

One solution to this problem is to provide a single sign-on. This simplifies the access for the user. However, this does not eliminate the increased overhead required when encryption is provided on the network and for the Layer 7 application.

These existing solutions result in additional cost and increased user frustration because the user may have to have multiple passwords to access the network and the Layer 7 application. This problem may be further exacerbated if the user has multiple layer 7 applications that each require the user to login. Moreover, additional network resources are consumed to provide multiple layers of encryption. What is needed is a solution that provides a single login for both the network and any layer 7 applications while providing a single layer of encryption.

SUMMARY

Systems and methods are provided to solve these and other problems and disadvantages of the prior art. A system and method for authenticating a layer 7 client application (application layer) based on a layer 2 (data link layer) or a layer 3 (network layer) authentication is provided. A request to authenticate to a network is received from a communication device. The request to authenticate to the network is for a layer 2 or layer 3 authentication. The communication device is authenticated to the network based on having the necessary credentials.

A request is received to authenticate a layer 7 client application running on the communication device. The layer 7 client application running on the communication device requires a layer 7 authentication. The layer 7 client application running on the communication device is authenticated based on the layer 2 or layer 3 authentication.

In an embodiment, authenticating the communication device to the network is accomplished in a wireless access point. Authenticating the layer 7 client application running on the communication device is accomplished in a layer 7 proxy application in the wireless access point.

In an embodiment, the layer 7 proxy application is a Session Initiation Protocol (SIP) proxy server.

In an embodiment, authenticating the layer 7 client application running on the communication device includes making a determination that the communication device is authenticated from an authentication table. In addition, one or more credentials are created for authenticating the layer 7 client application running on the communication device in the wireless access point. The one or more credentials indicate that the communication device is authenticated to the network. The one or more credentials are sent to a server.

In an embodiment, the one or more credentials comprise an indication to not authenticate any communications at layer 7 and based on the layer 2 or layer 3 authentication the system forgoes encryption between the communication device layer 7 client application and the network access point layer 7 proxy application at layer 6.

In an embodiment, one or more credentials are received at the server. This results in the server allowing access to a corresponding layer 7 server application.

In an embodiment, the layer 7 application running on the communication device is a Session Initiation Protocol (SIP) application and the one or more credentials are in a SIP header or field.

In an embodiment, the layer 7 client application running on the communication device is at least one of the following: a Session Initiation Protocol (SIP) application, a H.323 application, a File Transfer Protocol (FTP) application, a Telnet Application, and a Hyper Text Transfer Protocol (HTTP) application.

In an embodiment, the layer 2 or layer 3 authentication is a layer 2 authentication.

In an embodiment, the layer 2 or layer 3 authentication is a layer 3 authentication.

In an embodiment, a request to authenticate a second layer 7 client application running on the communication device is received. The second layer 7 client application running on the communication device is authenticated based on the layer 2 or layer 3 authentication.

DETAILED DESCRIPTION

Figure 1:
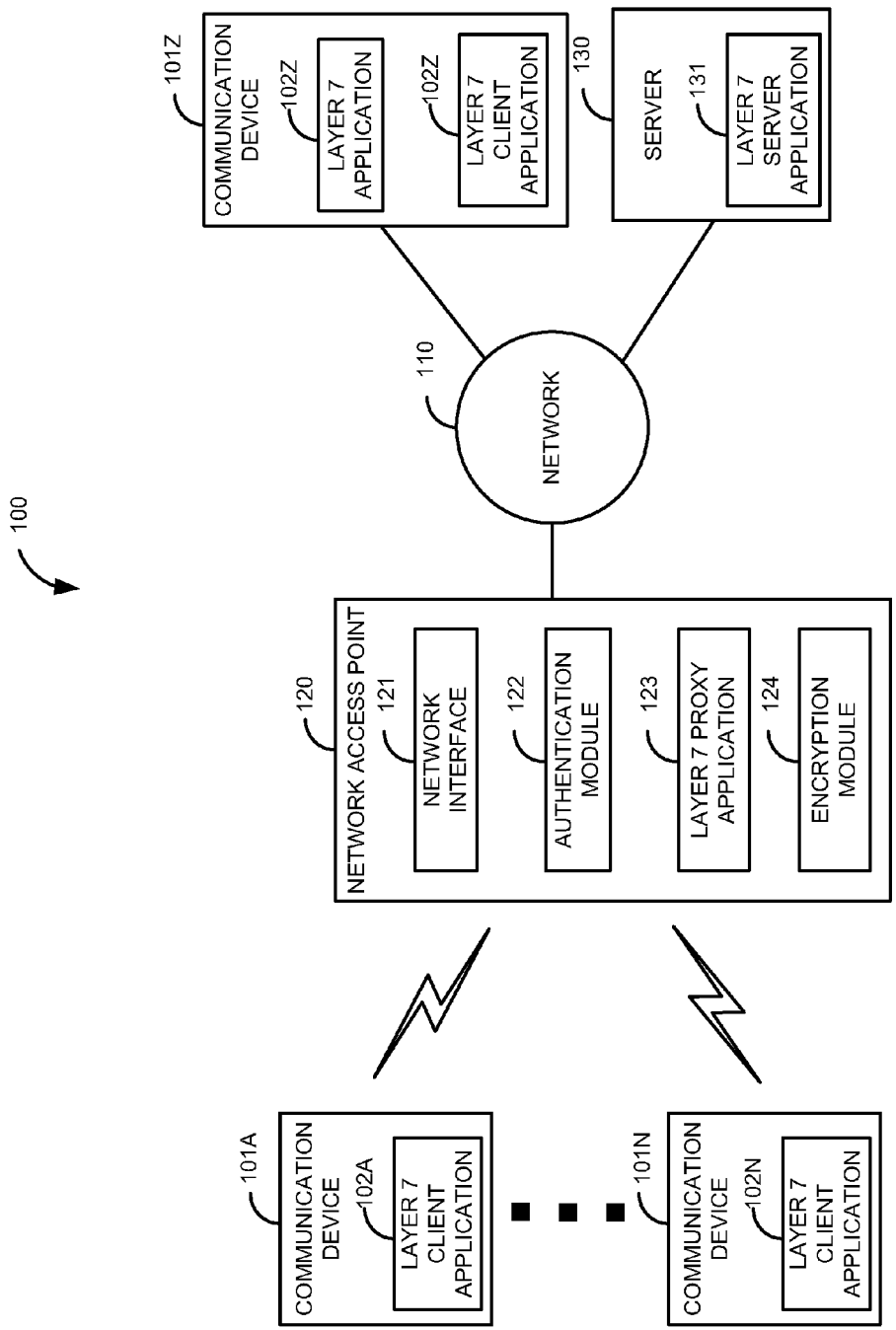
FIG. 1 is a block diagram of a first illustrative system for providing authentication.

FIG. 1 is a block diagram of a first illustrative system 100 for providing authentication. The first illustrative system 100 comprises communication devices 101A-101N, communication device 101Z, network access point 120, network 110, and server 130.

The communication device 101 may be any device that can communicate on the network 110, such as a Personal Computer (PC), a telephone, a video system, a cellular telephone, a Personal Digital Assistant (PDA), a tablet device, a notebook device, and the like. As shown in FIG. 1, any number of communication devices 101A-101N may be connected to network 110, including only a single communication device 101. In FIG. 1, the communication devices 101A-101N are shown connecting wirelessly to the network access point 120. However, the communication devices 101A-101N may be directly connected to the network access point 120 via wires, fiber optics, and the like.

The communication device 101 further comprises a Layer 7 client application 102. The Layer 7 client application 102 can be any application layer hardware/software that can run on the communication device 101. The Layer 7 client application 102 can be any application or use any protocol that operates in layer 7, such as Session Initiation Protocol (SIP), email, H.323, File Transfer Protocol (FTP), Telnet, Hyper Text Transfer Protocol (HTTP), Domain Naming Service (DNS), and the like. Layer 7 is in reference to the Open System Interconnect (OSI) 7 layer model. The layer 7 client application, in many instances, will have a corresponding layer 7 server application 131 that the layer 7 client application 102 communicates with. The 7 layer OSI model comprises the following 7 layers: 1) the physical layer, 2) the data link layer, 3) the network layer, 4) the transport layer, 5) the session layer, 6) the presentation layer, and 7) the application layer. In this document, the discussion of various layers is in reference to the layers defined by the OSI model.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, 802.11, Internet Protocol (IP), Session Initiation Protocol (SIP), Integrated Services Digital Network (ISDN), and the like. Although the network 110 is shown separately from the network access point 120 and the server 130, the network 110 can comprise the network access point 120 and the server 130.

The network access point 120 can be any hardware/software that can allow communication device 101 to access the network 110. For example, the network access point 120 can be a WiFi access point, a cellular base station, a wireless Local Area Network (LAN) access point, an Ethernet switch, a router, a switch, a server, a wired access point, and the like. The network access point 120 can support a variety of protocols such as the Internet Protocol (IP), Transmission Control Protocol (TCP), Ethernet, Sonnet, Token Ring, 802.1x, Wi-Fi Protected Access (WPA), WPA2, Wired Equivalent Privacy (WEP), IPSec, cellular network protocols, and the like. The network access point 120 is typically used by communication devices to authenticate to network 110.

The network access point 120 further comprises a network interface 121, an authentication module 122, a layer 7 proxy application 123, and an encryption module 124. The network interface 121 can be any hardware/software, such as, an 802.11 access point, a cellular access point, an Ethernet card, an Ethernet Switch, a power line access point, and the like. The network interface 121 can comprise two or more network interfaces. For example, the network interface 121 can comprise and interface to communicate with communication devices 101A-101N and an interface to communicate on network 110.

The authentication module 122 can be any hardware/software that can authenticate a user or device to network 110. For example, the authentication module 122 may authenticate the user using a variety of security protocols, such as Wi-Fi Protected Access (WPA), WPA2, Wired Equivalent Privacy (WEP), IPSec, Kerberos, Diffie-Helman, PKI, and the like. The authentication module 122 can be used to authenticate communication devices 101A-101N to network 110.

The layer 7 proxy application 123 can be any hardware/software that can interact with the layer 7 server application 131 and/or the layer 7 client application 102. For example, the layer 7 proxy application 123 can be a Session Initiation Protocol (SIP) proxy server that can be used to authenticate a SIP session based on a layer 2 or layer 3 authentication.

The encryption module 124 can be any hardware/software that can encrypt information. The encryption module 124 can encrypt information such as packets at various network layers using various encryption protocols. For example, the encryption module 124 can encrypt information in packets at the network layer and/or at the presentation layer using different encryption protocols.

The server 130 can be any server that can communicate on the network 110, such as, a communication manager, a Private Branch Exchange (PBX), a File Transfer Protocol (FTP) server, a file server, a switch, a router, a gateway, and the like. The server 130 further comprises a layer 7 server application 131. The layer 7 server application 131 on server 130 can be part of a distributed layer 7 application, such as, a distributed Session Initiation Protocol (SIP) system, a File Transfer Protocol (FTP) application, a Domain Name Server (DNS), an email system, a video system, and the like.

The communication device 101A sends a request for a layer 2 or layer 3 authentication to the network access point 120. The request for a layer 2 or layer 3 authentication contains one or more credentials such as a user name, a password, a digital certificate, a token, and the like. For example, a token can indicate that the layer 7 server application 131 is to bypass any additional layer 7 authentication mechanisms for a particular communication session or communication device 101. The request for the layer 2 or layer 3 authentication can be initiated automatically, upon detection of the network access point 120 by the communication device 101A, based on a user of the communication device 101A providing a login name and/or password, and the like.

The request for the for the layer 2 or layer 3 authentication can based on a layer 2 protocol, such as 802.11 MAC protocol, Ethernet, Link Access Procedure on the D channel (LAPD), Link Access Procedure on the B channel (LAPB), Asynchronous Transfer Mode (ATM), General Packet Radio Service LLC layer protocol, and the like. The request for the layer 2 or layer 3 authentication can be based on a layer 3 protocol such as 802.11, Internet Protocol (IP), Integrated Services Digital Network (ISDN), and the like. The request for the layer 2 or layer 3 authentication may or may not be encrypted.

The network interface 121 receives the request for the layer 2 or layer 3 authentication. The authentication module 122 determines if the credential(s) in the request for the layer 2 or layer 3 authentication are correct. If the credential(s) in the request for the layer 2 or layer 3 authentication are correct, the authentication module 122 authenticates the communication device 101A to the network 110.

Information associated with the layer 2 or layer 3 authentication may be stored in order to be used later for a layer 7 authentication. For example, information about which communication device 101A-101N was authenticated or about a specific user who was authenticated can be stored in a list, a table, a memory location, and the like. In addition, the credentials may be stored and provided as part of a layer 7 authentication. If a communication device 101 is logged out, if a communication device powered down, or if a user is logged out, the stored information can be deleted or changed to identify that the device or user is no longer authenticated. This can also be used as part of the layer 7 authentication.

The layer 7 client application 102A running on communication device 101A requires a layer 7 authentication. The layer 7 client application 102A sends a request to authenticate the layer 7 client application 102A to the network access point 120. The request to authenticate the layer 7 client application may be a specific request for layer 7 authentication. The request to authenticate the layer 7 client application may not contain a password or user ID. For example, the request to authenticate the layer 7 client application may be a request to access a service, such as a SIP service (i.e., a SIP INVITE). The network interface 121 receives the request to authenticate the layer 7 client application 102A. Based on the layer 2 or layer 3 authentication, the layer 7 proxy application 123 authenticates the layer 7 client application 102A. For example, the layer 7 proxy application 123 can authenticate the layer 7 client application 102A based on the credentials provided by the layer 3 authentication, based on layer 2 or 3 authentication information in a list or table stored in network access point 120, and the like. If the layer 7 server application 131 is a SIP application, the layer 7 proxy application 123 can provide credentials to the SIP server (131) when challenged for the necessary credentials.

The above process can also be implemented for any of the communication devices 101A-101N. The layer 7 client applications 102A-102N in communication devices 101A-101N may have the same type of layer 7 client applications 102 or have different types of layer 7 client applications 102. For instance, the layer 7 client application 102A in the communication device 101A may be an email application and the layer 7 client application 102N in the communication device 101N may be a File Transfer Protocol (FTP) application. In addition, an individual communication device 101 may contain multiple different layer 7 client applications 102. In the instance where multiple different layer 7 client applications 102 are running in the communication device 101, the multiple layer 7 client applications 102 can each be authenticated based on a single layer 2 or layer 3 authentication.

In an embodiment, the authentication module 122 can save information regarding the authentication of the communication device 101A to the network 110. Once the authentication occurs, the information can be stored in a table for each communication device 101 that has authenticated to network 110. The layer 7 proxy application 123 can determine that the communication device is authenticated to network 110 from the table.

After authenticating the layer 7 client application 102A, layer 7 proxy application 123 can create one or more credentials for authenticating the layer 7 client application 102A running on the communication device 101A. The credential(s) indicate that the communication device 101A is authenticated to the network 110. The credential(s) may then be sent to the server 130. The server 130 receives the credential(s). The server 240 allows access to the layer 7 server application 131. The credential(s) that are sent to the server 130 may, in some embodiments, be encrypted. In addition, the credential(s) may be sent in various ways. For example, if the layer 7 client application 101A and the layer 7 server application 131 are SIP applications, the credentials can be sent via SIP messages in a SIP header or field.

In addition to authenticating the layer 7 client application based on the layer 2 or layer 3, another benefit can be a reduction in encryption. For example, by not providing redundant encryption. When the communication device 101A authenticates at layer 2 or layer 3, encryption can be provided at those layers between network access point 121 and communication device 101A. In prior systems, after the network authentication, a communication is set up between communication device 101A and layer 7 server application 131 that is encrypted based on a separate layer 6 encryption, for example Transport Layer Security (TLS).

In an embodiment, the based on the layer 2 or layer 3 authentication, the layer 7 communication with the layer 7 application server 131 can forgo encryption of the layer 7 communication normally performed at layer 6. This provides the added benefit of removing a redundant layer of encryption and conserving limited client and server resources. Forgoing the encryption can be accomplished in various ways such as by being configured by an administrator, by the layer 7 client application 101A checking if the configured layer 7 proxy application 123 matches the default gateway IP address where the communication device 101A has already established layer 2 encryption in combination with being authenticated (at layer 2 or layer 3).

To further illustrate, consider the following example. Assume that the layer 7 client application 102A and the layer 7 server application 131 are SIP applications, that network access point 120 is a WiFi access point, and that communication device 101A is a personal computer. A user of the personal computer 101A boots up the personal computer 101A. The user has defined the credentials to access the network 110. The personal computer 101A detects the network access point 120. Based on detecting the network access point 120, the personal computer 101A automatically provides the credentials in a request to authenticate to the network 110. The network interface 121 receives the request to authenticate to the network 110. The authentication module 122 authenticates the request to access the network 110 and authenticates the personal computer 101A to the network 110.

A user at the communication device 101A wants to make a SIP call from the communication device 101A to the communication device 101Z. The user initiates the SIP client application 102A. The SIP client application 102A sends a request that is received by the layer 7 server application 131. The layer 7 proxy application 123 authenticates the SIP client application 102A running on personal computer 101A based on the authentication of the personal computer to network. The layer 7 proxy application 123 creates one or more credentials (or uses the layer 2 or layer 3 credentials) that indicate that the communication device 101A is authenticated to network 110. Network interface 121 sends the credentials to the server 130 (e.g., when the SIP layer 7 server application 131 challenges a SIP request). The server 130 receives the credentials. The layer 7 server application 131 allows the layer 7 client application 102A to initiate a SIP call via layer 7 server application 131. The user can now establish a SIP call to communication device 101Z.

Figure 2:
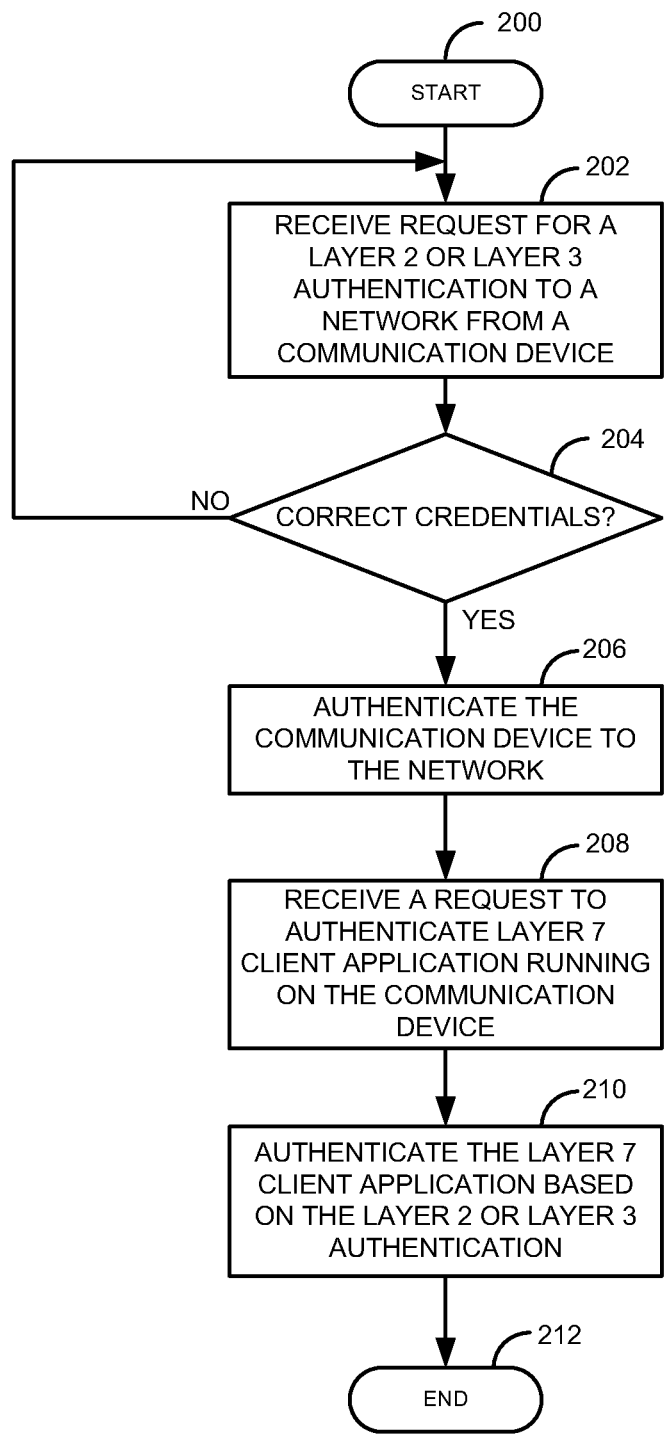
FIG. 2 is a flow diagram of a method for providing authentication.
Figure 3:
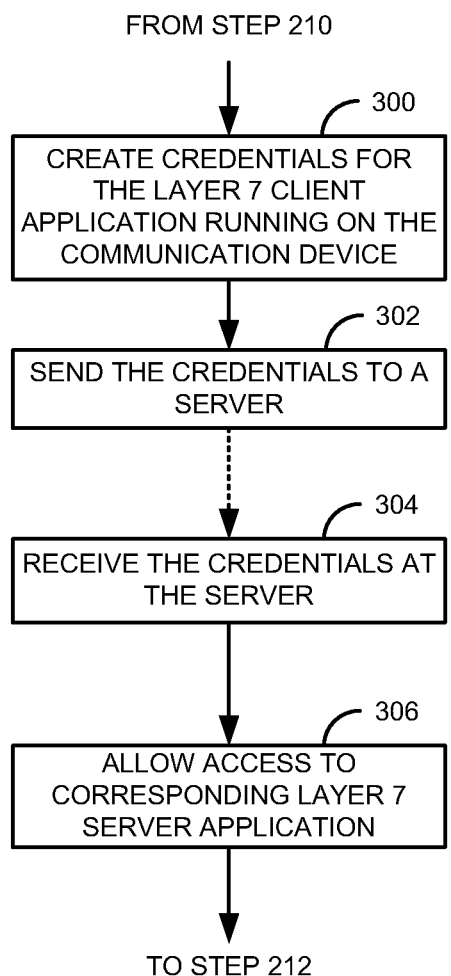
FIG. 3 is a flow diagram of a method for providing authentication to a layer 7 application on a server.

FIG. 2 is a flow diagram of a method for providing authentication. Illustratively, the communication device 101, the layer 7 client application 102, the layer 7 server application 131, the network access point 120, the network interface 121, the authentication module 122, the layer 7 proxy application 123, the encryption module 124, and the server 130 are stored-program-controlled entities, such as a computer or processor, which performs the method of FIGS. 2-3 and the processes described herein by executing program instructions stored in a tangible computer readable storage medium, such as a memory or disk. Although the methods described in FIGS. 2-3 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 200. A request is received 202 for a layer 2 or layer 3 authentication from a communication device. If the request does not have the correct credentials (e.g., the correct name and password) in step 204, the process goes back to step 202. Otherwise, if the credentials are correct in step 204, the communication device is authenticated 206 to the network.

A request is received 208 to authenticate the layer 7 client application running on the communication device. The layer 7 client application is authenticated 210 based on the layer 2 or layer 3 authentication. The above process describes authenticating the layer 7 client application. However, the authentication may be for a layer 7 server application 131. The process then ends in step 212. Steps 208-212 are shown in series with step 206. However, steps 208-210 may be implemented in a separate thread from steps 202-206.

FIG. 3 is a flow diagram of a method for providing authentication to a layer 7 application on a server. The process described in FIG. 3 may be inserted between steps 210 and 212 in FIG. 2. Note that steps 300 and 302 are implemented on one device and step 304 and 306 are implemented on another.

After authenticating the layer 7 client application, based on the layer 2 or layer 3 authentication in step 212, one or more credentials are created 300 for the layer 7 client application running on the communication device. The credential(s) are sent 302 to the server. The server receives 304 the credential(s). Access is allowed to a corresponding layer 7 server application.

To further illustrate, consider the following example. Assume that the layer 7 client application and the layer 7 server application are FTP applications, that network access point an Ethernet switch, and that communication device is a personal computer. A user of the personal computer boots up the personal computer. The personal computer detects the Ethernet switch. Based on detecting the Ethernet switch, the user, based on a login screen presented to the user, provides the credentials in a request to authenticate to the network. The Ethernet switch receives the request to authenticate to the network with the credentials. The process authenticates the request to access the network and authenticates the user to the network.

The user at the personal computer wants to transfer a file from the server using the File Transfer Protocol (FTP). The user initiates a FTP application in the communication device. The FTP application in the communication device sends a request to authenticate to the FTP server. The request to authenticate to the FTP server is received at the Ethernet switch. The Ethernet switch authenticates the FTP application running on the personal computer based on the authentication of the user to the network. The Ethernet switch creates one or more credentials that indicate that the user is authenticated to the network. The Ethernet switch sends the credentials to the FTP server. The FTP server receives the credentials. The server allows the FTP client application to initiate a file transfer from the FTP server to the personal computer.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for authenticating a communication device at Open System Interconnection (OSI) layer 7 based on an (OSI) layer 2 or (OSI) layer 3 authentication comprising:
    receiving, at a processor, a first request from the communication device to authenticate to a network, wherein the first request to authenticate to the network is for a layer 2 or layer 3 authentication;
    authenticating the communication device to the network using credentials associated with the communication device;
    storing authentication information for the communication device after successfully authenticating the communication device to the network;
    receiving, at the processor, a second request to authenticate a first layer 7 client application running on the communication device, wherein the first layer 7 client application running on the communication device requires a layer 7 authentication;
    retrieving the authentication information for the communication device;
    authenticating the first layer 7 client application running on the communication device based on the layer 2 or layer 3 authentication;
    creating one or more credentials for authenticating the first layer 7 client application running on the communication device, wherein the one or more credentials indicate that the communication device is authenticated to the network and wherein the one or more credentials for authenticating the first layer 7 client application comprises an indication to forgo any encryption at layer 6 based on the communication device being authenticated to the network at layer 2 or layer 3;
    sending the one or more credentials to a server; and
    allowing access to a layer 7 server application corresponding to the first layer 7 client application.

2. The method of claim 1, wherein the first layer 7 client application is authenticated by checking if a configured layer 7 proxy application matches a default gateway IP address that the communication device has established layer 2 encryption in combination with being authenticated at layer 2 or layer 3.

3. The method of claim 1, wherein the encryption at layer 6 is forgone based on a configuration by an administrator.

4. The method of claim 1, wherein authenticating the communication device to the network is accomplished in a wireless access point and authenticating the first layer 7 client application running on the communication device is accomplished in a layer 7 proxy application in the wireless access point.

5. The method of claim 4, wherein the layer 7 proxy application is a Session Initiation Protocol (SIP) proxy server.

6. The method of claim 4, wherein authenticating the first layer 7 client application running on the communication device comprises determining that the communication device is authenticated from an authentication table.

7. The method of claim 6, further comprising the step of: receiving the one or more credentials at the server.

8. The method of claim 6, wherein the first layer 7 client application running on the communication device is a Session Initiation Protocol (SIP) application and the one or more credentials are in a SIP header or field.

9. The method of claim 1, wherein the first layer 7 client application running on the communication device is at least one of the following: a Session Initiation Protocol (SIP) application, a H.323 application, a File Transfer Protocol (FTP) application, a Telnet Application, and a Hyper Text Transfer Protocol (HTTP) application.

10. The method of claim 1, wherein the layer 2 or layer 3 authentication is a layer 2 authentication.

11. The method of claim 1, wherein the layer 2 or layer 3 authentication is a layer 3 authentication.

12. A network access point comprising:
    a network interface configured to receive a first request for an Open System Interconnection (OSI) layer 2 or (OSI) layer 3 authentication to a network, from a communication device and receive a second request to authenticate a first (OSI) layer 7 client application running on the communication device, wherein the first layer 7 client application running on the communication device requires a layer 7 authentication;

a processor enabled authentication module that authenticates the communication device to the network at layer 2 or layer 3 using credentials associated with the communication device and stores authentication information for the communication device after successfully authenticating the communication device to the network at layer 2 or layer 3;

a layer 7 proxy application configured to authenticate the first layer 7 client application running on the communication device based on the layer 2 or layer 3 authentication and allow access to a corresponding layer 7 server application; and a wireless access point configured to retrieve the authentication information for the communication device, create one or more credentials for authenticating the first layer 7 client application running on the communication device, send the one or more credentials to a server, wherein the one or more credentials for authenticating the first layer 7 client application comprises an indication to forgo any encryption at layer 6 based on the communication device being authenticated to the network at layer 2 or layer 3.

13. The network access point of claim 12, wherein the first layer 7 client application is authenticated by checking if a configured layer 7 proxy application matches a default gateway IP address that the communication device has established layer 2 encryption in combination with being authenticated at layer 2 or layer 3.

14. The network access point of claim 12, wherein the layer 7 proxy application is a Session Initiation Protocol (SIP) proxy server.

15. The network access point of claim 12, wherein:
the layer 7 proxy application is further configured to determine that the communication device is authenticated from an authentication table.

16. The network access point of claim 15, wherein the server is further configured to receive the one or more credentials and allow the access to a corresponding layer 7 server application.

17. The network access point of claim 15, wherein the first layer 7 client application running on the communication device is a Session Initiation Protocol (SIP) application and the one or more credentials are in a SIP header or field.

18. The network access point of claim 12, wherein the first layer 7 client application running on the communication device is at least one of the following: a Session Initiation Protocol (SIP) application, a H.323 application, a File Transfer Protocol (FTP) application, a Telnet Application, and a Hyper Text Transfer Protocol (HTTP) application.

19. The network access point of claim 12, wherein:
the network interface is further configured to receive a request to authenticate a second layer 7 client application running on the communication device; and
the layer 7 proxy application is further configured to authenticate the second layer 7 client application running on the communication device based on the layer 2 or layer 3 authentication.

20. A non-transient computer readable medium having stored thereon instructions that cause a processor to execute a method, the method comprising:
instructions to receive a first request from a communication device to authenticate to a network, wherein the first request to authenticate to the network is an Open System Interconnection (OSI) layer 2 or (OSI) layer 3 authentication;
instructions to authenticate the communication device to the network using credentials associated with the communication device;
instructions to store authentication information for the communication device after successfully authenticating the communication device to the network;
instructions to receive a second request to authenticate an (OSI) layer 7 client application running on the communication device, wherein the layer 7 client application running on the communication device requires a layer 7 authentication;
instructions to authenticate the layer 7 client application running on the communication device based on the layer 2 or layer 3 authentication;
instructions to retrieve the authentication information for the communication device;
instructions to create one or more credentials for authenticating the first layer 7 client application running on the communication device, wherein the one or more credentials for authenticating the first layer 7 client application comprises an indication to forgo any encryption at layer 6 based on the communication device being authenticated to the network at layer 2 or layer 3; and
instructions to send the one or more credentials to a server; and
instructions to allow access to a layer 7 server application corresponding to the layer 7 client application.

\* \* \* \* \*